Dec. 15, 1931.   E. BUCKINGHAM ET AL   1,836,898
APPARATUS FOR PROJECTING MOTION PICTURES
Filed June 12, 1926   3 Sheets-Sheet 1

INVENTOR.
Wilho A. Kosken
BY Earle Buckingham
Cornelius Kaluskie
ATTORNEYS.

Dec. 15, 1931. E. BUCKINGHAM ET AL 1,836,898
APPARATUS FOR PROJECTING MOTION PICTURES
Filed June 12, 1926    3 Sheets-Sheet 2

INVENTOR.
Wilho A. Kosken
BY Earle Buckingham
ATTORNEYS.

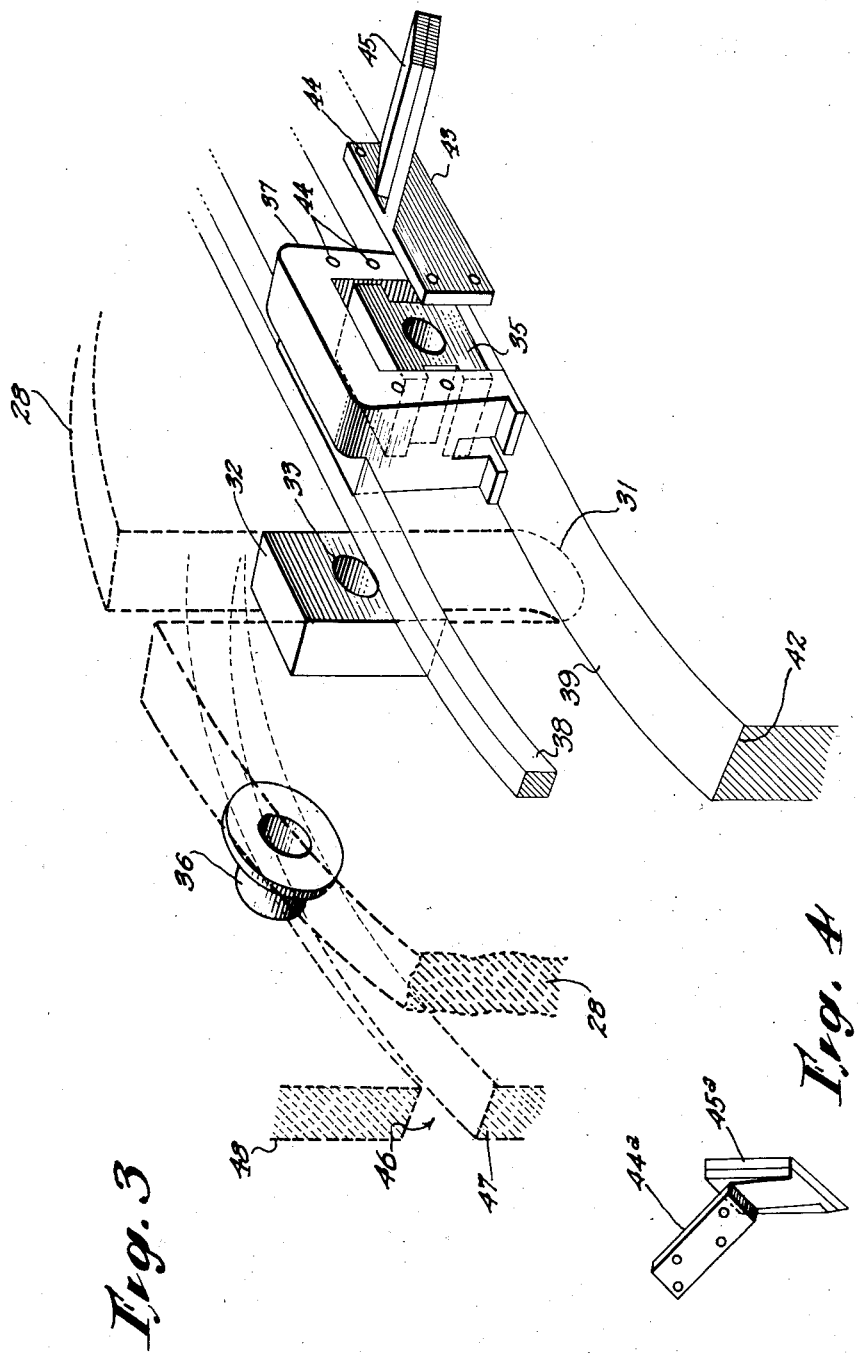

Patented Dec. 15, 1931

1,836,898

UNITED STATES PATENT OFFICE

EARLE BUCKINGHAM, OF CAMBRIDGE, MASSACHUSETTS, AND WILHO A. KOSKEN, OF NEW YORK, N. Y., ASSIGNORS, BY MESNE ASSIGNMENTS, TO WILHO A. KOSKEN, INC., A CORPORATION OF NEW YORK

APPARATUS FOR PROJECTING MOTION PICTURES

Application filed June 12, 1926. Serial No. 115,448.

This invention relates to the art of motion pictures and is more particularly directed to apparatus for either taking or projecting motion pictures.

Speaking generally, the invention relates to a camera or projector employing continuously moving deflectors and a continuously moving film in contradistinction to the conventional prior practice of taking or projecting pictures on or from an intermittently moving film and cooperating shutter mechanism. In accordance with this invention, no shutters are required, the film moves continuously and the images are photographed or projected by means of continuously moving deflectors which will produce continuous images.

The object of the present invention is to provide a simple and efficient commercial machine which can be economically manufactured by quantity production methods and wherein a high degree of skill and precision is not necessary in such manufacture.

A further feature of the invention is to provide a machine wherein wear due to continued use through long periods will not seriously interfere with the proper taking or projection of images.

Another feature of the invention consists in the employment of a minimum number of working parts and a standardization and duplication of similar parts throughout the apparatus as will be hereinafter more fully explained.

In practically carrying out the invention in the projection of motion pictures, a beam of light is passed through a continuously moving film and beyond such film is caused to impinge upon a series of continuously moving deflectors, hereinafter termed the primary series, so operating as to successively receive and reflect the beam upon a second series of continuously moving deflectors, hereinafter termed the secondary series. The deflectors of the secondary series move along continuous paths in a continuous manner and are positioned to receive the beam from the deflectors of the primary series and to reflect said beam in the direction of the objective lens whereby the beam is passed through the lens and thence to the screen.

It is essential to the proper projection of motion pictures by a continuously moving film and continuously moving deflectors that the linear speed of the deflectors, while in the optical field, be constant. In other words, the deflectors should move at a constant speed from the time they enter the optical field until they leave it. That is to say, there should be no acceleration or retardation of the movement of the deflectors of the primary series with respect to those of the secondary series or with respect to the film. There should be, for correct projection, a constant relation between both series of deflectors and the film throughout the projecting operation.

Whenever the relation to which reference has been made has been attempted in prior practice, the apparatus which has resulted has been relatively complicated and where complicated apparatus has not been employed, the constant linear speed to which we have referred has not been produced. In accordance with the present invention, however, the movement of the parts under consideration is rendered absolutely constant and the apparatus entering into the construction is nevertheless relatively simple in construction. This is made possible by what may be termed a differential or compensating movement which forms the underlying principle of this invention.

In practically carrying out the invention, the mechanisms for operating the primary and secondary series of deflectors are to all intents and purposes the same with reference to one another. In the preferred form of the invention, these two so called movements each embody a rotary disk which is radially slotted and in each slot is mounted a slide block adapted to reciprocate radially of the disks in the slides under the guidance of an associated main cam follower. The deflectors are carried by the said follower and the follower is secured to the slide block in such manner that as the disk rotates, the main follower cooperates with associated cams in such manner as to move the follower along the cam track. That portion of the cam track which corresponds to the optical field is substantially straight, but inasmuch as the rotary movement of the disk will present different radial distances at different portions of the cam track in the optical field portion thereof, means is provided to render constant linear movement of the main follower during this portion of its travel.

This means, in practice, embodies a speed cam or cams with which a speed cam follower cooperates and this latter follower is associated with the slide block in such manner as to effect a movement of the slide block radially of the slots in the disk to such degree as is necessary to compensate for the rotary movement of the disk, whereby the linear speed of the main follower is rendered constant. In other words, the actual linear speed of the main follower (and consequently of the deflector), is the result of differential movements. That is to say, it is the result of movement imparted to the main follower along a substantially straight cam track by the rotary movement of a disk taken together with the radial movement of the slide in the slot of such disk.

It will of course be understood that there are as many slots in each disk as there are deflectors and followers and slide blocks are duplicated or associated with each deflector.

The mechanism which has been described with reference to one of the movements is of course duplicated for the other and both movements are interconnected by suitable gearing, so that their operations are synchronized with one another and they are also interconnected with mechanism for operating the film in order that all three of these parts are synchronized in their operations. It will of course be understood, however, that while the deflectors of both the primary and secondary series are carried by the respective main followers, that the carriers by means of which these deflectors are mounted on their respective followers, must necessarily be of different shape for the secondary series than those which are used in connection with the primary series. This is a matter of detail, however, and will be hereinafter more fully explained.

It is of importance to note that by the mechanism which has been described, it is possible to operate both upper and lower movements about fixed axes. That is to say, all of the mechanism of the upper or second movement operates about a single fixed shaft, while the same is true of all of the mechanism of the lower or primary movement and these two shafts are simply geared together to obtain the desired synchronism, one of said shafts being in turn geared to the film drive in order to secure the synchronism between the operations of the both movements and the film.

In an apparatus so constituted all the parts move in a substantially continuous manner and all move along endless paths. Accordingly, vibration, such as would result from large numbers of reciprocating parts, is avoided.

The invention embodies numerous other features of construction which impart to it the simplicity, efficiency and reliability without entailing high manufacturing costs, and these features of novelty will be apparent from the following detailed description and claims when read in conjunction with the accompanying drawings.

The accompanying drawings illustrate one practical embodiment of the invention, but the construction therein shown is to be understood as illustrative only and not as defining the limits of the invention.

Figure 3 is a perspective view diagrammatically illustrating the relationship between those parts which insure constant linear speed of a deflector of the primary series while in the optical field; and, Figure 4 is a perspective view showing one of the deflectors of the secondary series and a carrier therewith.

Figure 1:
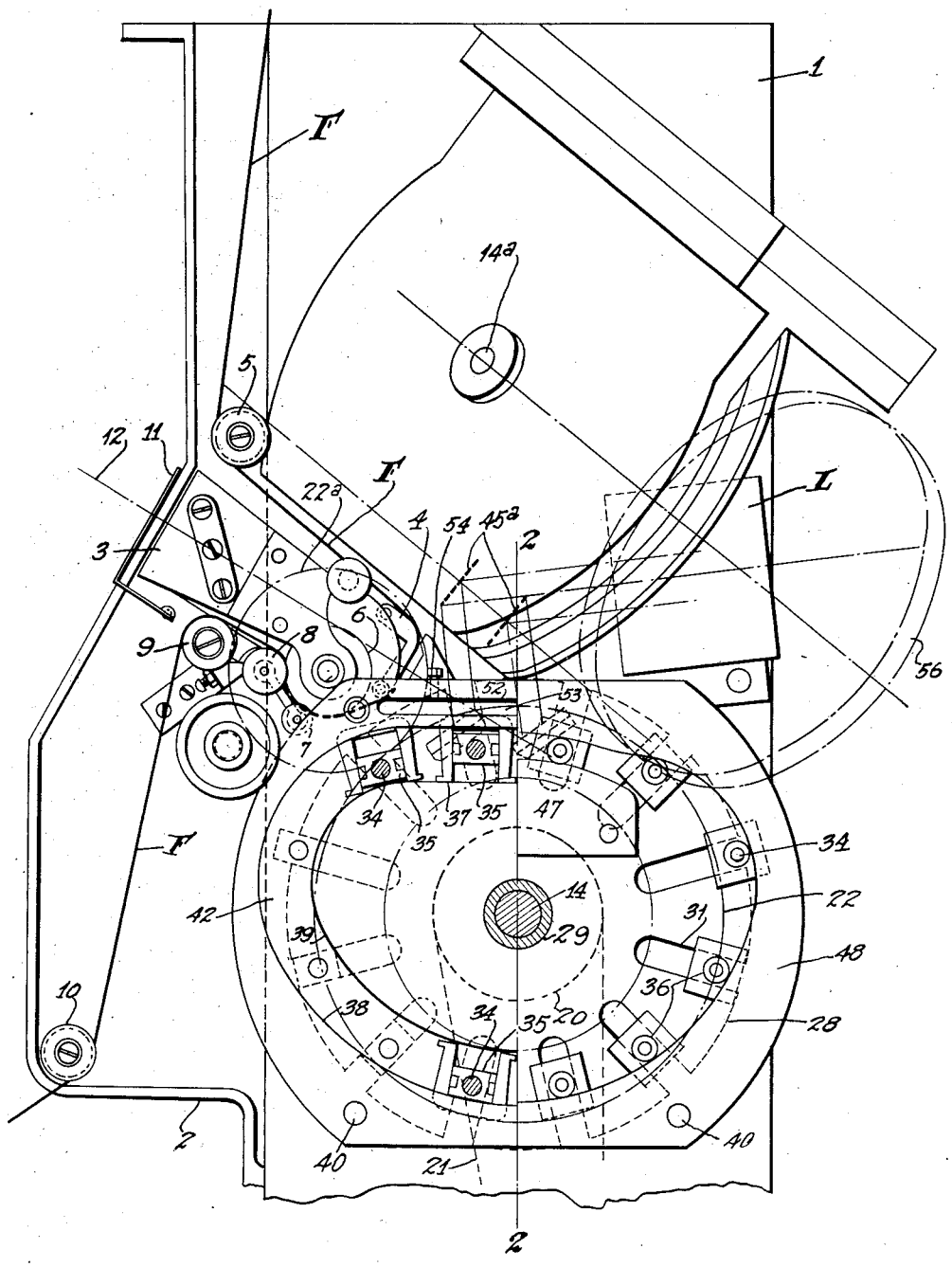
Figure 1 is a side elevation of a machine embodying the present invention, certain parts being shown in section in the interest of clearness.

The machine of this invention may be used either as a camera or projector, but, for the purpose of concrete description, we will hereinafter describe the apparatus as a projector.

In the practical embodiment of the invention shown in the drawings, 1 designates a suitable frame to the rear end of which is affixed a housing 2. 3 is the light tube which may be of any suitable construction and with the forward end of which is associated an adjustable film gate 4. The film F is fed from a suitable feed reel downwardly through the machine over a directional roll 5, and thence to and apast the film gate 4, whence it is passed to feed roll 6. From the feed roll 6, the film passes to tension rolls 7 and 8 and over directional rolls 9 and 10 beyond which it passes out of the housing 2 and to a suitable take up reel.

11 designates a fire shutter operable in any suitable way.

Any suitable film feed may be employed in this invention and we have therefore not considered it necessary to illustrate the parts which we have described in detail, but have simply enumerated them in order that it may be apparent that suitable means is provided for passing the film by the film gate.

Light is projected from any suitable source through the light tube 3 and through the film and the film is caused to travel apast a gate so that a beam of light is constantly projected through the film on to the deflectors of the lower or primary series in sequence. 12 designates the axis of the light beam.

The deflectors of the primary and secondary series, respectively, form parts of what may be termed the lower and upper movements. Both of these movements are substantially identical except that in the upper movement, the deflectors and the brackets or carriers on which they are mounted are of different shape than the corresponding parts of the lower movement. For these reasons, we have not thought it necessary to show both movements in detail, and have only detailed the lower movement and one deflector and its carrier of the upper movement.

Figure 2:
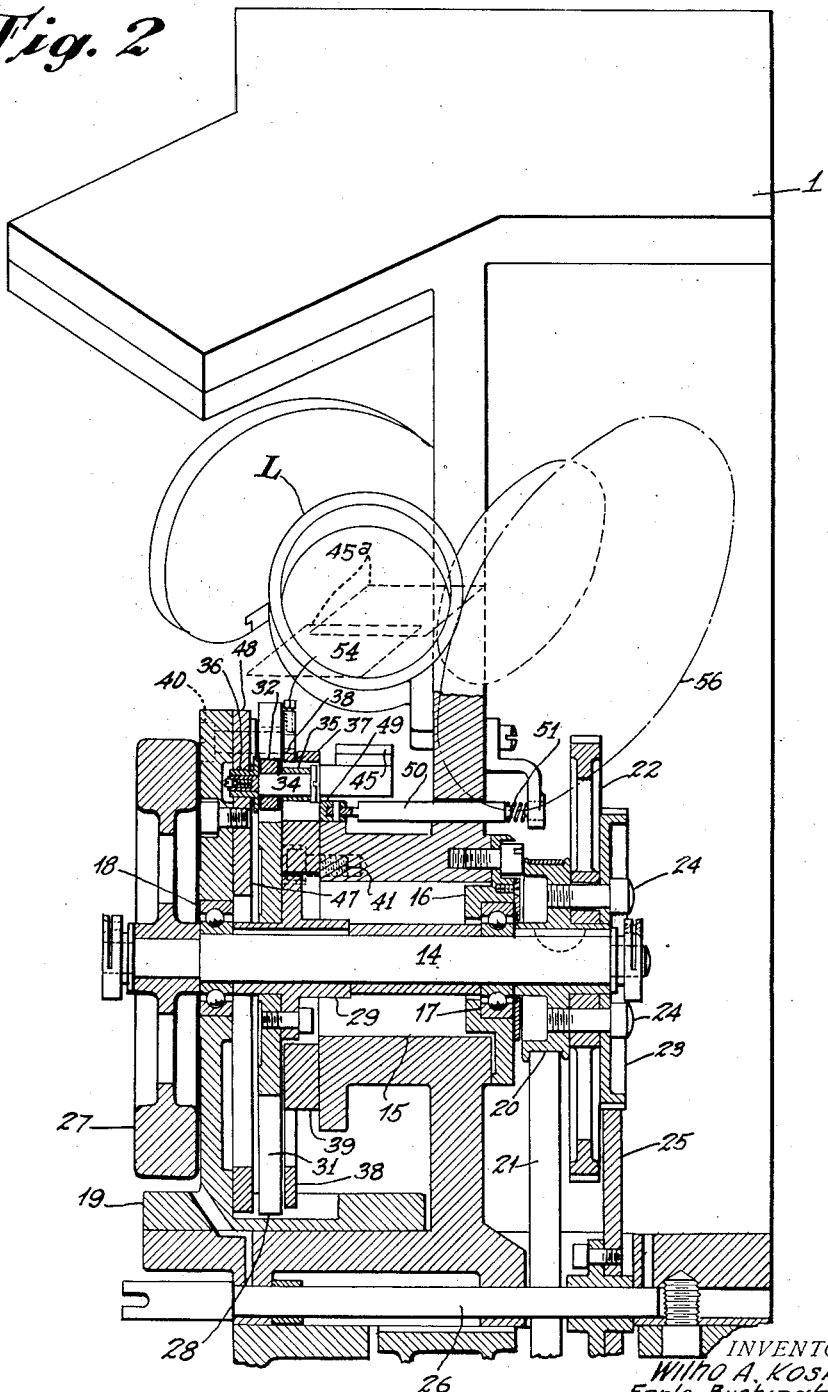
Figure 2 is a view looking from the front of the machine with the lower portion of the machine in section on the line 2—2 of Figure 1.

In Figures 1 and 2, it will be noted that the frame 1 carries a shaft 14. The shaft extends through a hole 15 in the frame which is made somewhat larger than the shaft. Into one end of this hole is fitted a bearing plate 16 which carries an antifriction bearing 17 in which one end of the shaft is mounted to rotate. The other end of the shaft is mounted in an antifriction bearing 18 carried by a standard 19 supported by the frame.

Fixed on one end of the shaft is a pulley 20 which serves to drive the belt 21 for operating the take up reel or for any other purpose. This pulley is keyed to the shaft and secured to the pulley are two gears 22 and 23, rigidly fixed to the pulley by screws 24. The gear 22 serves to drive the upper movement, as will be hereinafter more fully described and also serves to drive a gear 22a affixed to the shaft on which the film sprockets 6 are mounted to thereby drive the film.

The gear 23, however, meshes with a gear 25 fixed on the main drive shaft 26, which may be operated either by power or hand as may be desired. Through the connections described, the shaft 14 is rotated, preferably at a constant speed.

Mounted on the exterior side of the bracket 19 is a fly wheel 27 and mounted on the shaft interiorly of the bracket is a disk 28, the hub 29 of which is keyed to the shaft 14, so that the disk rotates with the shaft.

The disk 28 is radially slotted, i. e., it is provided with a plurality of radial slots 31 which extend inwardly from its outer circular periphery to a point about midway of said periphery and shaft 14, and in each of these slots a slide block 32 (see Figure 3) is mounted to reciprocate. Each block 32 is centrally perforated as shown at 33, and through each perforation extends a pin 34. The pin also extends through a guide block 35 and a speed cam follower 36 which are positioned on opposite sides of the slide block 32.

Each guide block 35 is in turn mounted to radially reciprocate within a yoke shaped follower 37 which is adapted to be guided during bodily movement about the shaft 14 in a suitable cam slot formed between an outer cam 38 and an inner cam 39. The outer cam 38 is fixedly secured by means of screws 40 to the bracket 19 and the inner cam 39 is fixedly secured by screws 41 to the frame 1. The two cams 38 and 39 are continuous in their nature, so that the cam slot in which the main follower 37 is adapted to travel constitutes a continuous path. This main cam slot is designated in the drawings by the reference character 42.

It will be apparent that as the disk 28 rotates, it will carry with it the several followers 37 by virtue of the engagement of the slide blocks 32 with the slots 31 and such followers will traverse the cam slots once for every complete rotation of the disk.

Mounted on each main follower is a deflector carrier 43 secured thereto by passing screws through registering perforations 44 in the carrier and follower and mounted on each carrier is a deflector 45. There are of course as many deflectors as there are main followers and as the mechanism operates the followers travel in a path to be brought consecutively into the optical field of the light beam after said beam is passed through the film. In other words, the beam is projected constantly and after passing through the film is intercepted by the deflectors of the primary series successively and said deflectors are set at such angle and are so relatively positioned that the beam will at all times impinge one or more of said deflectors for the purpose of bending the beam and deflecting it in an upward direction to impinge one or more deflectors of the secondary series which form part of the upper movement. It is necessary for proper projection that the deflectors travel in a substantially straight path during impingement of the beam thereon, i. e., while in the optical field. For this reason, the upper portion of the cam slot, i. e., that portion corresponding to the optical field is straight as clearly appears from Figures 1 and 3.

Thus, while the followers 37 are passing through this straight portion of the cam slot, the deflectors will travel along a straight path being propelled all the while, by the corresponding slide blocks 32. We have found, however, that when it is attempted to propel a deflector along a straight path by a slide block operating in the rotary slot of a rotary disk that a variation in speed of movement of the follower results. That is to say, there will be a slight slow down of the follower as it approaches a point directly above the shaft 14, while beyond this point there will be a slight speeding up or acceleration of the follower. If projection of the beam is attempted without correction of this slowing down and acceleration, the projected image on the screen will shift its position and render the projection faulty. One of the important features of this invention, therefore, is to provide means for compensating for this irregularity in speed and for producing uniform linear speed of travel of the deflectors, while in the optical field. It is for this purpose that a speed cam follower 36 is associated with each main follower 37.

The speed cam followers 36 are adapted to cooperate, while the main followers 37 are passing through the optical field with a cam slot 46 formed between inner and outer speed cams 47 and 48, both of which are secured to the inner face of a bracket 19, as shown best in Figure 2.

Bearing in mind that a pin 34 secures each speed cam follower 36 to one slide block 32 and one guide block 35, this operation will be apparent. That is to say, as the slotted disk 28 rotates to move a main follower 37 along the main cam track 42, the corresponding speed cam follower 36 will enter into cooperation with the speed cam slot 46 at about the time the main follower 37 enters the straight portion of the slot 42. As the rotation of the disk proceeds to cause the main follower to traverse the straight portion of this slot, the speed cam will be caused to travel through the speed cam slot 46, which may, in practice, be shaped on substantially the true arc of a circle. Theoretically, this arc is not a true arc of a circle, but it is found, in practice, that the division is so slight as to be negligible. The radius of this arc is such that while the main follower is traveling along a straight portion of the cam slot 42, there will be sufficient outward radial movement imparted by the speed cam follower to the slide block 32 to maintain a constant speed of travel of the main follower.

This is manifestly accomplished by sliding the slide block 32 longitudinally of the slot 31, so as to present different portions of the slide block to different portions of the radius of the disk 28, so that different portions of the pusher surface of the slot will impel the main follower along its path. The sliding relationship between the guide block 35 and the follower 37 permits of this operation.

It will thus appear that the constant speed of travel of the deflector while in the optical field is the result of differential movement. In other words, it is a result of two distinct movements, viz., the rotary movement of the disk 28 and the rising and falling movement of the speed cam follower under the impulse of its cam slot 46. There results an absolute uniform speed of travel of the deflectors.

The utilization of a differential or compensating movement constitutes the primary object of this invention and it follows from the foregoing detailed description that this result is accomplished in a simple and thoroughly efficient manner.

It is of course desirable that during the movement of the deflectors in the manner described that lost motion be eliminated as far as practical. This is obviated in many ways. For example, in Figure 2, it will be noted, that throughout the straight portion of the cam slot 42, the main followers 37 are held against transverse lost motion by means of a pressure bar 49, which is held by means of spring pressed pins 50 against the faces of the main followers. The springs are designated 51 and force the bar 49 to the left in Figure 2 under relatively slight pressure. To take up lost motion which may result from wear at the straight portion of the cam slot, the outer cam 38 is slotted, as shown at 52, a strip of metal 53 is positioned in this slot, and set screws 54 are adapted to be taken up from time to time to force the strip 53 up in the direction of the cam slot 42, whereby slight wear is taken up in said slot by an almost imperceptible warping of the portion 55 of the outer cam.

The upper movement is in all substantial respects the same as the lower movement. The shaft 14a corresponds to the shaft 14 and it has affixed to one end a spiral gear 56 which meshes with the gear 22 by which it is driven, so that both upper and lower movements are driven in synchronism and at the same speed.

It will of course be apparent that the deflectors 45a of the upper series are set at such angle as to receive the deflected beam from the lower series and to bend the beam and pass it through the objective lens, designated generally by the reference character L.

Figure 4 shows the shape of a carrier 44a of each secondary deflector. One of these carriers is mounted on each main follower of the upper movement and this shaping is such as to carry the deflector at the desired angular inclination to bend the beam as described.

It will be noted that the upper movement is turned in angular relation to the lower movement, i. e., the shaft 14a is not parallel to the shaft 14. This is preferably to secure standardization of the parts and to give the same pitch for the deflectors of both movements. It greatly facilitates manufacture and enables parts used in the lower movement to be used in the upper movement.

We have not considered it necessary to show all the details in the drawings nor have we considered it necessary to duplicate the showing of the lower movement in the upper movement, since the invention is particularly directed to the uniformity of travel of a deflector, while in an optical field, and this is clearly shown in connection with the lower movement. We are aware that details of construction may be varied without departing from the spirit of this invention and are also cognizant of certain amplifications which might be made and which would produce the differential and compensating movement to which we have referred. The showing made, however, is highly efficient in the carrying out of its intended functions and is illustrative of the invention when broadly considered. For these reasons, the invention is to be understood as not limited to the specific showing of the drawings, but is rather to be understood as fully commensurate with the appended claims.

In practice, it is found that through the utilization of the compensating or differential movement, to which reference has been made, perfect projection of pictures may be carried on. All of the parts which cooperate in the projection of consecutive images, including the film, constantly travel at timed speeds with reference to one another. In other words, there was always the same relation between the speed of the film and the speed of the deflectors. The parts are synchronized at all times and flicker or shifting of a picture on the screen is entirely obviated. Further, by properly placing the deflectors and operating them in the manner described, constant focal length of the projected images is secured.

Having thus fully described the invention, what we claim as new and desire to secure by Letters Patent is:

1. In a motion picture machine, a member mounted to rotate about a fixed axis and provided with a substantially radially extending pusher surface, deflector moving means bearing against said surface and adapted to be propelled by said surface, a deflector carrier operated by the moving means, means for confining the deflector carrier to a substantially straight path for a portion of the extent of its travel, and cam means for shifting the propelling means into engagement with different portions of the pusher surface to insure constant speed of travel of the deflector along the straight portion of its path while said member rotates at a constant speed.

2. In a motion picture machine, a main cam track having a substantially straight portion, a main follower mounted to traverse said cam track, a deflector carried by said follower, a radially slotted disk positioned adjacent the cam track and adapted to rotate, a slide block in the slot of said disk, a speed cam positioned adjacent the disk, a speed cam follower cooperating with the speed cam, and means for securing the speed cam follower to the slide block and for also securing the slide block to the main follower to provide for radial movement of the slide block while the main follower moves along the straight portion of the cam track.

3. In a motion picture machine, a radially slotted disk mounted to rotate on a fixed axis, a slide block positioned in each slot and adapted to be carried about the axis by rotation of the disk, a rod extending through each slide block, a guide block and a speed cam follower mounted on each rod, a main cam follower slidably secured to each guide block to be carried along with the guide block as the disk rotates, but adapted to traverse a predetermined path while the guide block moves in a direction radially of the disk, a main cam track cooperating with the main followers to control the path of movement of said followers, a deflector carried by each main follower, and a speed cam cooperating with the speed cam followers for shifting the slide blocks longitudinally of the respective slots in the disk, while the disk is rotating.

4. In a motion picture machine, a rotary element mounted to rotate about a fixed axis and provided with a substantially radially extending pusher surface, a deflector guided for movement along a straight path, a deflector moving member engaging with said surface and propelled by said surface to impart movement to the deflector, and cam means for controlling the position of the deflector moving member on said radial pusher surface, said cam being shaped to cause the deflector to move at a constant speed along said straight path, when the rotary member is rotated at a constant speed.

5. In a motion picture machine, a deflector mounted for bodily movement along an endless path, a portion of which is straight, means for limiting the movement of the deflector to a straight line movement while traversing the straight portion of said path, a rotary member for propelling the deflector, and means for rendering the deflector responsive to different radial portions of the rotary member for the purpose of insuring constant speed of the deflector while it is traversing the straight portion of its path.

6. In a motion picture machine, a deflector, means to guide the deflector along a substantially straight path, a rotary member, operative connections between the rotary member and the deflector for driving the deflector, and means, acting upon said operative connections, to maintain the speed of the deflector constant while the deflector is traveling along said path and while the rotary member is rotating at a constant speed.

7. In a motion picture machine, a deflector, means for guiding the deflector along an endless path, a portion of which is substantially straight, a rotary member, operative connections between the rotary member and the deflector for driving the deflector along said path, and means, acting upon said operative connections to maintain the speed of the deflector constant while it is traversing the straight portion of the path and while the rotary member is rotating at a constant speed.

8. In a motion picture machine, a deflector, means for guiding the deflector along an endless path, a portion of which is substantially straight, a rotary member, having a substantially radial guide, an element secured to the deflector and coacting with said guide, whereby rotation of the rotary member imparts movement to the deflector along said path, and means coacting with said element for adjusting it radially of the guide to insure constant speed of travel of the deflector while it is traversing the straight portion of its path and while the rotary member is rotating at a constant speed.

9. In a motion picture machine, a member mounted to rotate at a constant speed about a fixed axis and having substantially radial guides, a plurality of deflectors mounted to travel along a continuous path, a portion of which is substantially straight, an element movable along said path with each deflector and coacting with one of the guides to impart movement to the deflectors along said path, a stationary cam track juxtaposed with the straight portion of said path, and a follower secured to each element and adapted to coact with the said track during travel of the element along the straight portion of said path, said track being shaped to present said elements to such portions of the guides as to produce constant speed of travel of the deflectors along the straight portion of their path.

In testimony whereof, WILHO A. KOSKEN has signed his name to this specification at New York, N. Y., this 27th day of May, 1926.

WILHO A. KOSKEN.

In testimony whereof, EARLE BUCKINGHAM, has signed his name to this specification at Cambridge, Mass., this 28th day of May, 1926.

EARLE BUCKINGHAM.